United States Patent Office 3,375,174
Patented Mar. 26, 1968

3,375,174
MICROBIOLOGICAL HYDROXYLATION OF STEROIDS
Pierre Crabbé and Carlos Casas-Campillo, Mexico City, Mexico, assignors to Syntex Corporation, Panama, Panama, a corporation of Panama
No Drawing. Filed Jan. 21, 1965, Ser. No. 427,085
4 Claims. (Cl. 195—51)

ABSTRACT OF THE DISCLOSURE

Microbiological process of preparing the 15α-hydroxy derivatives of estrone and estradiol and the 6β-hydroxy derivatives of the 3-methyl ethers of estrone and estradiol by subjecting the corresponding desoxy compounds to the enzymes of *Gibberella fujikuroi* (*Fusarium moniliforme*), the thus prepared hydroxy compounds being estrogenic agents useful in fertility control.

---

The present invention relates to a novel process for the preparation of cyclopentanophenanthrene derivatives.

More particularly the present invention relates to a novel process for the production of 15α-hydroxy-estrone, 15α-hydroxyestradiol, the 3-methyl ether of 6β-hydroxy-estrone and the 3-methyl ether of 6β-hydroxy-estradiol, by submitting the coresponding 15-desoxy or 6-desoxy starting compounds to the oxidizing action of the enzymes produced by *Gibberella fujikuroi* (*Fusarium moniliforme*).

The final compounds indicated hereinbefore, are very active estrogenic agents, useful in fertility control.

The process of the present invention involves treating a compound selected from the group consisting of estrone, estradiol, 3-methyl ether of estrone, and the 3-methyl ether of estradiol, with the enzymes produced by the microorganism *Gibberella fujikuroi* (*Fusarium moniliforme*), especially of the strains ATCC Nos. 9851, 10704, 11161, 11573, 12764, and 14842. This can be accomplished by incubating a compound selected from the aforementioned group with the microorganism under aerobic conditions in a medium which contains a source of nitrogen, a source of carbon, an inorganic salt and tap water. The action of the enzymes is not limited only when the microorganism is present, for even though this is preferable because it renders the operation more facile, the enzymes alone in a suitable medium may cause the same oxidation of the starting compound.

The culture medium employed for the incubation may contain as a source of nitrogen, peptone, meat extract or other commercial product such as Phytone (product of the enzymatic digestion of soya meal; Baltimore Biological Laboratories, Baltimore, Md.), Casitone, Edamine, Nutrient L-1 (product of the hydrolysis of lactalbumin; Sheffield Farms, Norwich, N.Y.), any usual peptone in microbiological cultures and similar compounds, or the source of nitrogen may be of inorganic nature, such as alkali metal nitrates, etc. The source of carbon may be carbohydrate such as for example glucose, starch, cane sugar, lactose, maltose, glycerine, etc. The inorganic salt may be a halide, phosphate, sulfate, or a nitrate or an alkaline or alkaline earth metal, for example sodium chloride, calcium chloride, potassium sulfate, sodium nitrate, magnesium sulfate, monopotassium phosphate, or any other salt to those skilled in the art which is used in microbiological cultures.

A very useful culture medium for the incubation of the aforementioned microorganism, is Czapek's medium which is a mixture of sucrose, sodium nitrate, potassium phosphate, magnesium sulfate, potassium chloride, ferrous sulfate and bactor-agar (Difco Laboratories, Inc. Detroit, Mich.). The starting steroid may also be treated with enzymatic preparations of *Gibberella fujikuroi* (*Fusarium moniliforme*) and especially of the strains indicated hereinbefore, following methods well known to those skilled in the art, such as the destruction of the cells in an aqueous buffer medium by means of homogenizers, vibrators of the Mickle type or ultrasonic vibrators, followed by the centrifugation of the cells and treatment of the steroid wtih the overfloating liquid during approximately from 2 to 10 hours.

The incubation of the aforesaid microorganism in presence of the steroid may be effected between approximately 20° C. and 40° C. preferably between 25° C. and 30° C., during a time which may vary between about 24 and 96 hours, preferably between approximately 48 and 72 hours.

The isolation of the steroid is carried out by the usual methods, such as extraction from the incubation medium with an organic solvent immiscible with water, for example a halogenated hydrocarbon such as methylene chloride, ethylene dichloride, chloroform, trichloroethane, etc., aromatic homocyclic solvents, e.g., benzene, toluene, xylene and other similar solvents, followed by the evaporation of the extract, the final product being purified by known methods, the most common ones being chromatography or crystallization.

The steroid may be put in contact with the microorganism following several methods, for example: in a medium wherein the latter has already been incubated during from 2 to7 days and to which the steroid is added; in a sterile medium to which there are added the steroid and the cells of the microorganism (which may be separated from the original incubation medium by conventional procedures, such as centrifugation) either simultaneously or separated by short periods of time; or by any other technique known by those skilled in the art and which is conventional in microbiological incubations of steroids. In any of the above methods, the steroid may be added, either in solid form or in form of a solution or suspension in a solvent which will not affect the microorganisms, such as alcohol, acetone, dioxane, or any other solvent conventional in microbiological incubations. The amount of starting steroid may vary between approximately 0.001 and 0.5% in weight of the total mixture.

The hydroxylation of the present invention may also be carried out using spores of *Gibberella fujikuroi* which are free from the mycelium formed during fermentation, in an aqueous medium free from nutritional substances. In order to obtain spores free from mycelium, the vegetative growth obtained in a suitable culture medium containing carbohydrates, salts and organic nitrogen sources, preferably Czapek's medium, is first filtered through glass wool to separate the mycelium. The resulting filtrate is centrifuged to separate the spores, which are then washed with water several times to completely eliminate the nutritional medium. The spores thus obtained may be kept in dried form or suspended in water or buffered solutions at a low temperature. Furthermore, such suspension may be standarized to contain a definite number of spores per cubic centimeter.

The yields in final steroids vary according to factors such as the starting steroid, culture medium, the time and temperature of the incubation, the strains of microorganism used, etc.

According to the present invention, the surprising discovery has been made, that when estrone or estradiol are treated with the enzymes produced by *Gibberella fujikuroi* (*Fusarium moniliforme*), there is obtained the corresponding 15α-hydroxy compound, but if the starting compound is the 3-methyl ether of the aforesaid compounds the product obtained is almost quantitatively the corresponding 6β-hydroxy derivative.

The following specific examples serve to illustrate but are not intended to limit the scope of the present invention:

Example I

The vegetative growth of *Gibberella fujikuroi* (*Fusarium moniliforme*), ATCC 11161, obtained after one week's incubation at 25° C. in an inclined test tube containing a potato dextrose-agar medium was suspended in 10 cc. of sterile water. One cc. of this suspension was then used to inoculate 10 one-liter Erlenmeyer flasks, each containing 200 cc. of Czapek's solution supplemented with 0.05% of yeast extract. The flasks were stirred in the presence of air, under submerged conditions (rotatory shakers operated at 150 r.p.m.) for 18 to 21 hours to obtain an abundant growth of the microorganism. To each flask there was then added 50 mg. of estrone and the incubation was resumed for 18 hours further under the same conditions. Following this incubation period, the contents of the flasks were combined and then extracted several times with methylene chloride, dried over anhydrous sodium sulfate, and evaporated to dryness under reduced pressure. The residue was dissolved in methylene chloride, absorbed in a column charged with 15 grams of silica gel and 15 grams of Celite. The fractions eluted from the column were found to contain 350 mg. of 15α-hydroxy estrone.

Example II

The procedure of Example I was repeated in every detail but one. The oxygenating agent used was a culture of *Gibberella fujikuroi* (*Fusarium moniliforme*), ATCC No. 14842, and 15α-hydroxy estrone was produced in similar yield.

Example III

Each of 10 one liter Erlenmeyer flasks containing 200 cc. of Czapek's solution supplemented with 0.05% of yeast extract were inoculated with 1 cc. of an aqueous microbial suspension of *Gibberella fujikuroi* (*Fusarium moniliforme*), ATCC No. 14842, obtained by superficial growth in potato dextrose-agar in an inclined text tube in the manner described in Example I.

Immediately after the addition of the microbial suspension, 50 mg. of estradiol were added to each flask, and the flasks were then stirred under aerobic conditions for 24 hours. The contents of the flasks were combined, extracted with chloroform, and the organic extract washed with water, dried and evaporated to dryness under reduced pressure. By chromatography on the residue on silica gel-Celite there was obtained 15α-hydroxy-estradiol, in 75% yield.

Example IV

The procedure of Example III was repeated but instead of adding the steroid starting material in solid form, it was added dissolved in 2 cc. of dioxane per 50 mg. of steroid. Again 15α-hydroxy-estradiol was produced, this time in 68% yield.

Example V

The 3-methyl ether of estrone and the 3-methyl ether of estradiol were treated according to Example I, thus affording respectively the 3-methyl ether of 6β-hydroxy estrone and the 3-methyl ether of 6β-hydroxy-estradiol.

Example VI

The process described in Example I was repeated, except that the microorganism used was the *Gibberella fujikuroi* (*Fusarium moniliforme*), ATCC 11573, thus affording the same final compound.

Example VII

The process described in Example I was repeated, except that the strain used was *Gibberella fujikuroi* (*Fusarium moniliforme*), ATCC 12764, thus affording the same final compound in 70% yield.

Example VIII

The process described in Example I was repeated, except that the strain used was *Gibberella fujikuroi* (*Fusarium moniliforme*), ATCC 9851, thus obtaining the same final product with similar yield.

Example IX

The process described in Example III was repeated, except that the strain used was *Gibberella fujikuroi* (*Fusarium moniliforme*), ATCC 10704, to produce 15α-hydroxy-estradiol in 70% yield.

We claim:
1. A process for 6β-hydroxylating a compound selected from the group consisting of the 3-methyl ether of estrone and the 3-methyl ether of estradiol, which comprises subjecting the compound to the enzymes of *Gibberella fujikuroi* (*Fusarium moniliforme*) and isolating the hydroxylated steroid thereby formed.

2. The process of claim 1 wherein the microorganism is selected from the group consisting of the strains ATCC Nos. 14842, 11573, 12764, 9851, 11161, and 10704.

3. A process for converting the 3-methyl ether of estrone to the corresponding 6β-hydroxy compound which comprises subjecting the 3-methyl ether of estrone to the action of enzymes of a microorganism of the species *Gibberella fujikuroi* (*Fusarium moniliforme*) and isolating the hydroxylated steroid thereby formed.

4. A process for converting the 3-methyl ether of estradiol to the corresponding 6β-hydroxy compound which comprises subjecting the 3-methyl ether of estradiol to the action of enzymes of a microorganism of the species *Gibberella fujikuroi* (*Fusarium moniliforme*) and isolating the hydroxylated steroid thereby formed.

References Cited

UNITED STATES PATENTS

| | | | |
|---|---|---|---|
| 2,889,255 | 6/1959 | Murray et al. | 195—51 |
| 3,125,495 | 3/1964 | Laskin et al. | 195—51 |

ALVIN E. TANENHOLTZ, *Primary Examiner.*